US011630989B2

(12) United States Patent
Mroueh et al.

(10) Patent No.: US 11,630,989 B2
(45) Date of Patent: Apr. 18, 2023

(54) MUTUAL INFORMATION NEURAL ESTIMATION WITH ETA-TRICK

(71) Applicant: INTERNATIONAL BUSINESS MACHINES CORPORATION, Armonk, NY (US)

(72) Inventors: Youssef Mroueh, New York, NY (US); Pierre L. Dognin, White Plains, NY (US); Igor Melnyk, White Plains, NY (US); Jarret Ross, Wichita, KS (US); Tom D. J. Sercu, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 311 days.

(21) Appl. No.: 16/813,633

(22) Filed: Mar. 9, 2020

(65) Prior Publication Data
US 2021/0287099 A1    Sep. 16, 2021

(51) Int. Cl.
*G06N 3/08* (2006.01)
*G06N 3/04* (2023.01)
*G06N 3/088* (2023.01)

(52) U.S. Cl.
CPC ........... *G06N 3/0454* (2013.01); *G06N 3/088* (2013.01)

(58) Field of Classification Search
CPC .......... G06N 3/0454; G06N 3/08; G06N 3/04; G06N 3/088
See application file for complete search history.

(56) References Cited

U.S. PATENT DOCUMENTS 7,007,001 B2 *   2/2006   Oliver ................. G06K 9/6297
                                                        704/E15.029
9,940,551 B1 *   4/2018   Mordvintsev .......... G06V 10/82

OTHER PUBLICATIONS

Alemi, A. A. et al., "Fixing a Broken ELBO"; arXiv:1711.00464v3 [cs.LG]; (2018); 21 pgs.
Alemi, A. A. et al., "Deep Variational Information Bottleneck"; arXiv:1612.00410v7 [cs.LG]; (2019); 19 pgs.
Argyriou, A. et al., "Convex Multi-Task Feature Learning"; University College London, Department of Computer Science; (Date: Unknown), 40 pgs.

(Continued)

*Primary Examiner* — Tuan H Nguyen
(74) *Attorney, Agent, or Firm* — Intelletek Law Group, PLLC; Gabriel Daniel, Esq.

(57) ABSTRACT

A computing device receives a data X and Y, each having N samples. A function f(x,y) is defined to be a trainable neural network based on the data X and the data Y. A permuted version of the data Y is created. A loss mean is computed based on the trainable neural network f(x,y), the permuted version of the sample data Y, and a trainable scalar variable η. A loss with respect to the scalar variable η and the trainable neural network is minimized. Upon determining that the loss is at or below the predetermined threshold, estimating a mutual information (MI) between a test data $X_T$ and $Y_T$. If the estimated MI is above a predetermined threshold, the test data $X_T$ and $Y_T$ is deemed to be dependent. Otherwise, it is deemed to be independent.

20 Claims, 10 Drawing Sheets

(56) References Cited

OTHER PUBLICATIONS

Bach, F. et al., "Optimization with Sparsity-Inducing Penalties"; arXiv:1108.0775v2 (2011); 116 pgs.
Barber, D. et al., "The IM Algorithm: A variational approach to Information Maximization"; Institute for Adaptive and Neural Computation; (Date: Unknown); 8 pgs.
Belghazi, M. I., et al., "Mutual Information Neural Estimation"; arXiv:1801.04062v4 [cs.LG]: (2018); 18 pgs.
Bell, A. J. et al., "An Information Maximisation Approach to Blind Separation and Blind Deconvolution"; Institute for Neural Computation (1995); 38 pgs.
Blei, D. M. et al., "Variational Inference: A Review for Statisticians"; arXiv:1601.00670v9 [stat.CO] (2018); 41 pgs.
Chen, X. et al., "InfoGAN: Interpretable Representation Learning by Information Maximizing Generative Adversarial Nets"; https://arxiv.org/abs/1606.03657 (2016). 9 pgs.
Dai, B. et al., "Learning from Conditional Distributions via Dual Embeddings"; arXiv:1607.04579v2 [cs.LG]; (2016), 24 pgs.
Doersch, C., et al., "Unsupervised Visual Representation Learning by Context Prediction"; arXiv:1505.05192v3 [cs.CV] (2016); 10 pgs.
Donsker, M. D. et al., "Asymptotic Evaluation of Certain Markov Process Expectations for Large Time, II"; Communications on Pure and Applied Mathematics (1975), vol. XXVIII; pp. 279-301.
Gomes, R. et al., "Discriminative Clustering by Regularized Information Maximization"; California Institute of Technology (Date: unknown); 9 pgs.
Gretton, A. et al., "A Kernel Two-Sample Test"; Journal of Machine Learning Research (2012); vol. 13; 723-773.
Gulrajani, I. et al., "Improved Training of Wasserstein GANs"; arXiv:1704.00028v3 [cs.LG]; (2017); 20 pgs.
Harchaoui, Z. et al., "Testing for Homogeneity with Kernel Fisher Discriminant Analysis"; LTCI, Telecom ParisTech and CNRS (Date: Unknown); 8 pgs.
Hjelm, R. D. et al., "Learning Deep Representations by Mutual Information Estimation and Maximization"; arXiv:1808.06670v5 [stat.ML]; (2019); 24 pgs.
Hu, W. et al., "Learning Discrete Representations via Information Maximizing Self-Augmented Training" arXiv:1702.08720v3 [stat.ML]; (2017); 15 pgs.
Kolchinsky, A. et al., "Nonlinear Information Bottleneck"; arXiv:1705.02436v9 [cS.IT]; (2019); 25 pgs.
Kolesnikov, A. et al., "Revisiting Self-Supervised Visual Representation Learning"; arXiv:1901.09005v1 [cs.CV] (2019); 13 pgs.
Kraskov, A. et al., "Estimating mutual information"; Physical Review (2004); vol. 69:066138; 16 pgs.
Lu, S. "Measuring Dependence Via Mutual Information"; Queen's University, Kingston, Ontario, Canada, (2011), 82 pgs.
Mohamed, S. et al., "Learning in Implicit Generative Models"; arXiv:1610.03483v4 [stat.ML]; (2017); 10 pgs.
Mroueh, Y. et al., "Fisher GAN"; arXiv:1705.09675v3 [cs.LG]; (2017); 29 pgs.
Mroueh, Y. et al., "Sobolev GAN"; arXiv:1711.04894v1 [cs.LG]: (2017); 34 pgs.
Mroueh, Y. et al., "Sobolev Descent"; arXiv:1805.12062v2 [cs.LG] (2019); 24 pgs.
Nguyen, X. et al., "Estimating Divergence Functionals and the Likelihood Ratio by Convex Risk Minimization"; IEEE Transactions on Information Theory (2010); vol. 56:11; pp. 5847-5861.
Noroozi, M. et al. "Unsupervised Learning of Visual Representations by Solving Jigsaw Puzzles"; arXiv:1603.09246v3 [cs.CV] (2017); 19 pgs.
Nowozin, S., et al., "f-GAN: Training Generative Neural Samplers using Variational Divergence Minimization"; 9 pgs.
Ozair, S. et al., "Wasserstein Dependency Measure for Representation Learning"; arXiv:1903.11780v1 [cs.LG] (2019); 10 pgs.
Poole, B. et al., "Improved generator objectives for GANs"; arXiv:1612.02780v1 [cs.LG]; (2016); 8 pgs.
Poole, B. et al., "On Variational Bounds of Mutual Information"; arXiv:1905.06922v1 [cs.LG]; (2019); 14 pgs.
Radford, A. et al., "Unsupervised Representation Learning with Deep Convolutional Generative Adversarial Networks"; arXiv:1511 06434v2 [cs.LG] (2016); 16 pgs.
Sriperumbudur, B. K. et al., "On Integral Probability Metrics, Ø-Divergences and Binary Classification"; arXiv:0901.2698v4 (2009); 18 pgs.
Tishby, N. et al., "The information bottleneck method"; arXiv.org, physics, arXiv:physics/0004057v1 (2000); 16 pgs.
Van Den Oord, A. et al., "Representation Learning with Contrastive Predictive Coding"; arXiv:1807.03748v2 [cs.LG] (2019); 13 pgs.

* cited by examiner

TABLE 1

| MI Estimator (bound) | Loss to minimize $\hat{L}$ | Constraints |
|---|---|---|
| DV-MINE (DV) | $\log\left(\frac{1}{N}\sum_{i=1}^{N} e^{f(x_i,\bar{y}_i)}\right) - \frac{1}{N}\sum_{i=1}^{N} f(x_i,y_i)$ | $f$ is a DNN |
| Unbiased DV-MINE | $\frac{\frac{1}{N}\sum_{i=1}^{N} e^{f(x_i,\bar{y}_i)}}{m} - \frac{1}{N}\sum_{i=1}^{N} f(x_i,y_i)$ | $f$ is a DNN, $m$ running avg. of $\frac{1}{N}\sum_{i=1}^{N} e^{f(x_i,\bar{y}_i)}$ |
| f-MINE (f-div) | $\frac{1}{N}\sum_{i=1}^{N} e^{f(x_i,\bar{y}_i)} - \frac{1}{N}\sum_{i=1}^{N} f(x_i,y_i) - 1$ | $f$ is in RKHS (convex) or $f$ is a DNN |
| α-MINE (DV) | $\frac{1}{N}\sum_{i=1}^{N}\left(\frac{e^{f(x_i,\bar{y}_i)}}{a(\bar{y}_i)} + \log(a(\bar{y}_i))\right) - \frac{1}{N}\sum_{i=1}^{N} f(x_i,y_i) - 1$ | $a$ is a DNN, $a > 0$ $f$ is a DNN |
| InfoNCE (-) | $\frac{1}{N}\sum_{i=1}^{N}\left(\log\frac{1}{N}\sum_{j=1}^{N} e^{f(x_i,\bar{y}_j)} - f(x_i,y_i)\right)$ | $f$ is a DNN |
| η-MINE (ours:η-DV) | $e^{-\eta}\frac{1}{N}\sum_{i=1}^{N} e^{f(x_i,\bar{y}_i)} - \sum_{i=1}^{N} f(x_i,y_i) + \eta - 1$ | $f$ is in RKHS or $f$ is a DNN; $\eta \in \mathbb{R}$ |
| η-MINE-convex (ours:η-DV) | $e^{-\eta}\frac{1}{N}\sum_{i=1}^{N} e^{\langle w,\Phi(x_i,\bar{y}_i)\rangle} - \sum_{i=1}^{N} \langle w,\Phi(x_i,y_i)\rangle + \eta - 1$ | $\Phi(\cdot)$ is fixed $w \in \mathbb{R}^{\dim(\Phi)}, \eta \in \mathbb{R}$ |

FIG. 4

Algorithm 1 $\eta$-MINE (Stochastic BCD)

Inputs: $X, Y$ dataset $X \in \mathbb{R}^{N \times d_x}, Y \in \mathbb{R}^{N \times d_y}$, such that $(x_i = X_{i,:}, y_i = Y_{i,:}) \sim p_{xy}$
Hyperparameters: $\alpha_\eta, \alpha_\theta$ (learning rates), $n_c$ (number of critic updates)
Initialize $\eta, \theta$ parameter of the neural network $f_\theta$
for $i = 1 \ldots$ MaxIter do
  for $j = 1 \ldots n_c$ do
    Fetch a minibatch of size $N$ $(x_i, y_i) \sim p_{xy}$
    Fetch a minibatch of size $N$ $(x_i, \tilde{y}_i) \sim p_x p_y$ $\{\tilde{y}_i \text{ obtained by permuting rows of } Y\}$
    Evaluate $\hat{L}(f_\theta, \eta) = e^{-\eta} \frac{1}{N} \sum_{i=1}^{N} e^{f_\theta(x_i, \tilde{y}_i)} - \frac{1}{N} \sum_{i=1}^{N} f_\theta(x_i, y_i) + \eta - 1$
    Stochastic Gradient step on $\theta$:
    $\theta \leftarrow \theta - \alpha_\theta \frac{\partial \hat{L}(f_\theta, \eta)}{\partial \theta}$ {We use ADAM}
  end for
  Update $\eta$:
  $\eta \leftarrow \eta - \alpha_\eta \frac{\partial \hat{L}(f_\theta, \eta)}{\partial \eta}$
end for
Output: $f_\theta, \eta, \hat{I}^{\text{eff}}_{\eta\text{-ISV}}(X, Y) = \frac{1}{N}\sum_{i=1}^{N} f_\theta(x_i, y_i) - e^{-\eta} \frac{1}{N} \sum_{i=1}^{N} e^{f_\theta(x_i, \tilde{y}_i)} - \eta + 1$

FIG. 5

MUTUAL INFORMATION NEURAL ESTIMATION WITH ETA-TRICK

STATEMENT REGARDING PRIOR DISCLOSURES BY THE INVENTOR OR A JOINT INVENTOR

Youssef Mroueh et al., "Improved Mutual Information Estimation," Sep. 25, 2019, available at https://openreview.net/forum?id=S11slCEYPB.

BACKGROUND

Technical Field

The present disclosure generally relates to computer systems, and more particularly, to improved computational efficiency by neural estimation.

Description of the Related Art

AI is a data-driven technology that takes unique datasets as input to train AI computer models on appropriately configured computing devices. Once trained, an AI computer model may take new data as input to predict, classify, or otherwise output results for use in a variety of applications. In machine learning, a widely used AI technique in computing systems, involves a process that uses data and algorithms to train (or teach) computer models. The trained model allows the computing device to make decisions without the need for explicit or rule-based programming. In particular, machine learning algorithms build a model on training data to identify and extract patterns from the data, and therefore acquire (or learn) unique knowledge that can be applied to new data sets.

Today, computing devices often use mutual information (MI) in data sets, which provides a ubiquitous measure of dependency between a pair of random variables, and is one of the corner stones of information theory. In machine learning, the information maximization principle for learning representation from unlabeled data through self-supervision motivated the development of many MI estimators and applications. The information bottleneck is another principle that triggered recent interest in mutual information estimation. MI is also used to understand the information flow in neural networks, in learning clusters and in regularizing the training of Generative Adversarial Networks (GANs).

SUMMARY

According to various embodiments, a computing device, a non-transitory computer readable storage medium, and a method are provided for determining whether data is related. A data X having N samples and a data Y having N samples is received. A function f(x,y) is defined to be a trainable neural network based on the data X and the data Y. Variable $\eta$ is defined to be trainable and scalar. A permuted version of the data Y is created. A loss mean based on the trainable neural network f(x,y), the permuted version of the sample data Y, and the trainable scalar variable $\eta$ is computed. A loss with respect to the trainable neural network f(x,y) and the scalar variable $\eta$ is minimized. It is determined whether the trainable neural network f(x,y) having undergone the minimization of the loss provides an output that meets one or more predetermined criteria. Upon determining that the trainable neural network f(x,y) has not met the one or more predetermined criteria, the process returns to the act of creating a permuted version of the second sample data Y and the iterative process continues. However, upon determining that the trainable neural network f(x,y) has met the one or more predetermined criteria, test data $X_T$ and $Y_T$ is received. A mutual information (MI) between the test data $X_T$ and $Y_T$ is estimated. Upon determining that the estimated MI is at or above a predetermined threshold, the test data $X_T$ and $Y_T$ is deemed to be dependent. However, upon determining that the estimated MI is not at or above the predetermined threshold, the test data $X_T$ and $Y_T$ is deemed to be independent.

In one embodiment, the one or more predetermined criteria include at least one of: a loss with respect to the trainable neural network f(x,y) and the scalar variable $\eta$ is at or below a predetermined threshold; or a maximum number of iterations of minimizing the loss with respect to the trainable neural network f(x,y) and the scalar variable $\eta$ is reached.

In one embodiment, a similarity between the data X and the data Y is determined by way of KL divergence for various bounds.

In one embodiment, the determination of the similarity between the data X and the data Y does not include a logarithm term.

In one embodiment, the determination of the similarity between the data X and the data Y includes: upon determining that the estimated MI is at or above the predetermined threshold, generating a positive scalar output; and upon determining that the estimated MI is not at or above the predetermined threshold, generating a negative scalar output.

In one embodiment, the permuted version of the data Y includes a random distribution of the N samples of the data Y with respect to the N samples of the data X.

In one embodiment, the loss mean is f(x_i, y_i)−exp(−eta) [mean exp [f(x_i, y0_i)]]+$\eta$−1.

In one embodiment, the estimation of the MI is based on I(xt, yt)>=mean f(xt_i, yt_i)−log [mean exp [f(xt_i, yt_i)]].

In one embodiment, $\eta$ plays a role of a Lagrange multiplier that ensures normalization of a likelihood ratio.

In one embodiment, the estimation of the mutual information (MI) between the test data $X_T$ and $Y_T$ includes a linear witness function.

In one embodiment, the estimated mutual information (MI) is used in the context of a generative adversarial network (GAN).

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIG. 4 illustrates a table that provides variational bounds for MI

FIG. 5 provides an algorithm outlining a process of $\eta$-MINE for MI estimation.

DETAILED DESCRIPTION

Overview

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

The present disclosure generally relates to improvements to computer-related technology. More particularly, it relates to improved computational efficiency and accuracy in computing devices that perform machine learning and artificial intelligence. In many machine learning applications and other scientific fields, a computing device performing the machine learning application estimates MI given samples from the joint distribution of high dimensional random variables. This is a challenging problem and many methods have been devised to address it. Since MI is defined as the Kullback-Leibler (KL) divergence between the joint distribution and the product of marginals, a computing device can leverage non-parametric estimators of f-divergences. Specifically of interest to us is the Donsker-Varadhan (DV) representation of the KL divergence that can be used with neural networks estimators. Other approaches to estimating the MI are through finding lower bounds using variational Bayesian methods, as well as through geometric methods like binning.

What is provided herein is a new estimator of MI that can be used in direct MI maximization or as a regularizer, thanks to its unbiased gradients. Our starting point is the DV lower bound of the KL divergence that is represented equivalently via a joint optimization that is referred to herein as $\eta$-DV on a witness function $f$ and an auxiliary variable $\eta$.

In one aspect what is also shown is that when the witness function $f$ is learned in a Reproducing Kernel Hilbert Space (RKHS) the $\eta$-DV problem is jointly convex in both $f$ and $\eta$. The dual of this problem sheds the light on this estimator as a constrained ratio estimation where $\eta$ plays the role of a Lagrange multiplier that ensures proper normalization of the likelihood ratio of the joint and the product of marginal probability distributions. What is also discussed herein is that the witness function can be estimated as a neural network. In one aspect, the estimator for MI is specified, and it is shown how it compares to known alternatives. Reference now is made in detail to the examples illustrated in the accompanying drawings and discussed below.

Example Architecture

Figure 1:
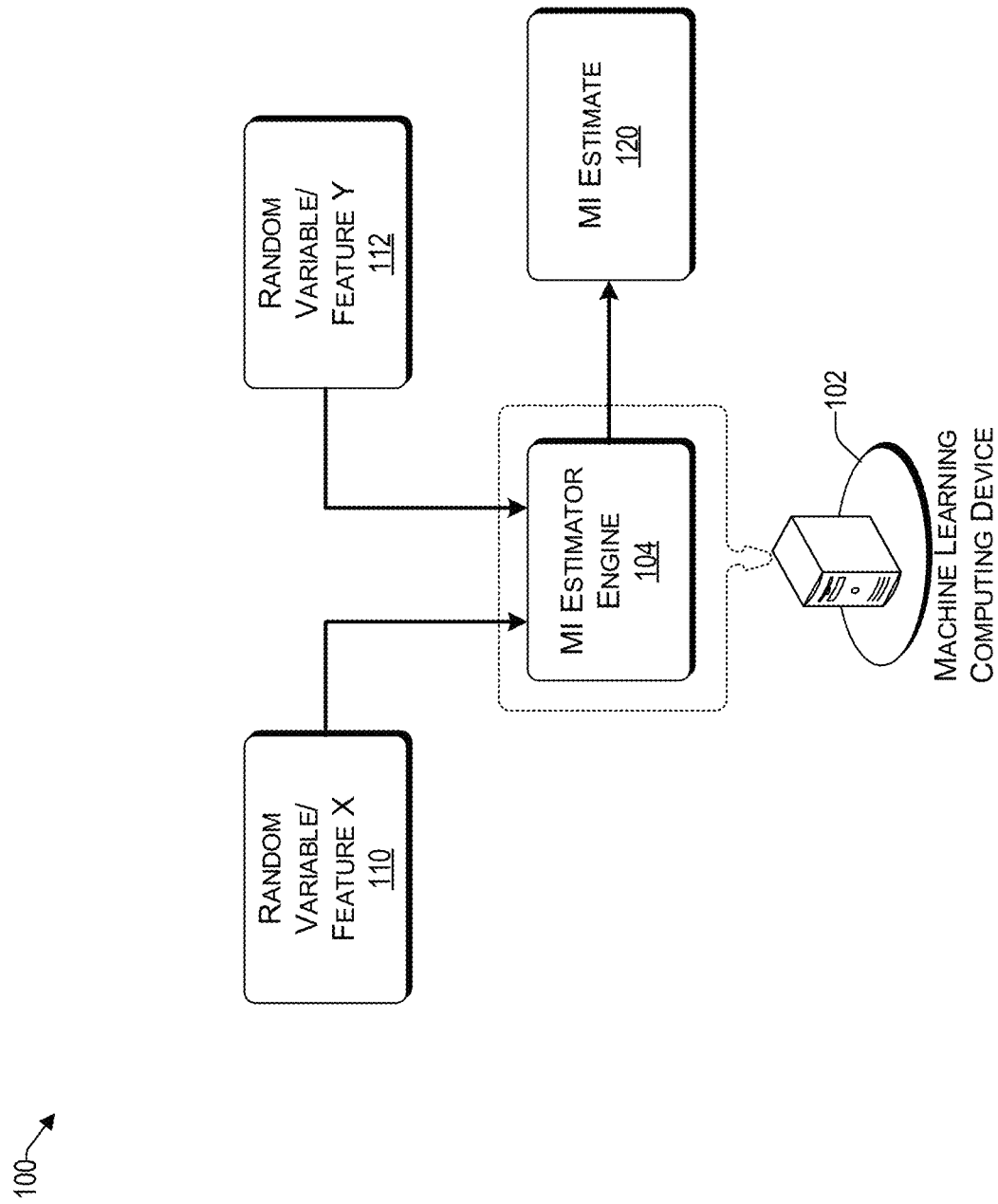
FIG. 1 illustrates an example architecture of a system that is able to perform a computationally efficient MI estimation of two sets of data, consistent with an illustrative embodiment.

FIG. 1 illustrates an example architecture 100 of a system that is able to perform a computationally efficient MI estimation, consistent with an illustrative embodiment. Architecture 100 includes a machine learning computing device 102 that hosts an MI estimator engine 104. The MI estimator engine 104 is operative to receive a first random variable/feature X 110 and a second random variable/feature Y 112 from various sources. For simplicity, a random variable/feature is sometimes collectively referred to herein as data. The MI estimator engine 104 is able to provide an efficient and unbiased mutual information estimation for the pair of random variables/features X and Y to determine their dependency (e.g., interdependency), represented by block 120. An estimate 120 that is at or above a predetermined threshold indicates that X, Y are related. Alternatively, an estimate 120 that is below the predetermined threshold indicates that X, Y are not related. It will be understood that the predetermined threshold, sometimes referred to herein as a baseline, may be different based on the subject application. As used herein, the term unbiased means that given a large number of data, it is still able to converge to a theoretical true value.

Figure 2:
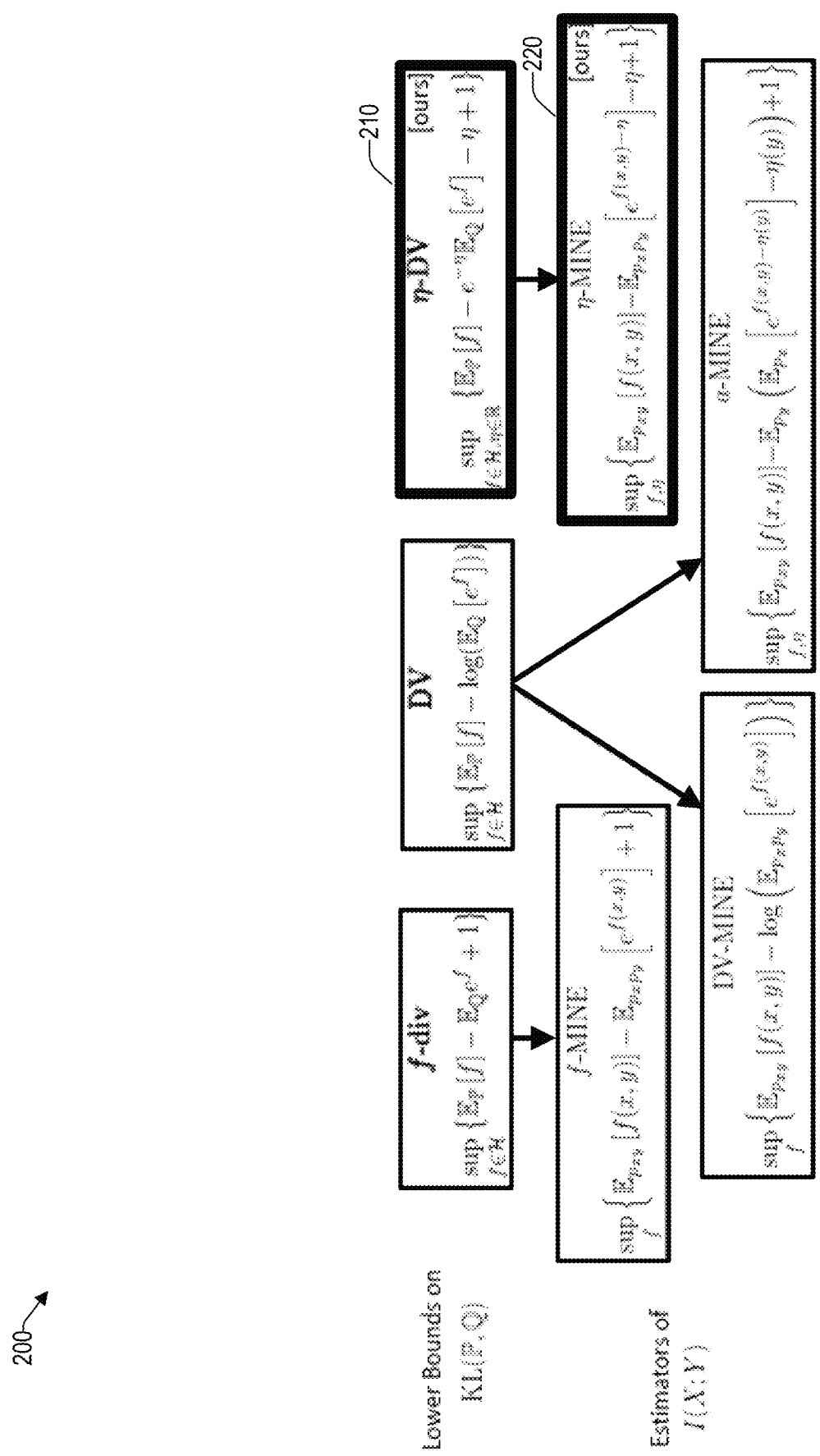
FIG. 2 is a block diagram providing an overview of the different bounds and corresponding estimators discussed herein.

A calculation of the MI of the pair of random variables/features X and Y may be too computationally complex for a computing device. Thus, a direct calculation of the MI of a pair of random variables/features is typically impractical. Rather, what is performed is an estimation of the MI by way of using lower bounds, discussed in more detail below. In this regard, reference is made to FIG. 2, which is a block diagram providing an overview of the different bounds and corresponding estimators discussed herein. The top row shows several KL divergence lower bounds for two probability distributions P and Q. By substituting $P=p_{xy}$, $Q=p_xp_y$, and defining $f$ as a neural network, we obtain corresponding MI estimators. $\eta$-DV 210 and $\eta$-MINE 220 are the proposed bound and its derived estimator.

Lower Bounds on Kullback-Leibler Divergences and Mutual Information

Consider two probability distributions P and Q, where P is absolutely continuous with regard to Q. Let p and q be their respective densities defined on $X \subset R^d$. Their Kullback-Leibler (KL) divergence is defined as follows:

$$KL(\mathbb{P}, \mathbb{Q}) = \mathbb{E}_{x \sim \mathbb{P}} \log\left(\frac{p(x)}{q(x)}\right) = \int p(x) \log\left(\frac{p(x)}{q(x)}\right) dx. \quad \text{(Eq. 1)}$$

We are interested in the MI between two random variables X, Y where X is defined on $X \subset R^{d_x}$, and $\bar{Y}$ on $Y \in R^{d_{ij}}$. Let $p_{xy}$ be their joint densities and $p_x$, $p_y$ the marginals of X and Y respectively. The MI is defined as follows:

$$I(X;Y)=KL(p_{xy},p_xp_y), \quad \text{(Eq. 2)}$$

Equation 2 above provides the KL divergence between the joint density and the product of marginals. Non-parametric estimation of MI from samples is a salient consideration in science and machine learning. Below, the variational lower bounds on KL to enable such estimation are discussed.

To determine the variational characterization of KL divergence, we let H be any function space mapping to R.

$$KL(P, Q) \geq D_{DV}^{\mathcal{H}}(P, Q) = sup\{\mathbb{E}_{x\sim P} f(x) - \log(\mathbb{E}_{x\sim Q} e^{f(x)}) : f \in \mathcal{H}\} \quad \text{(Eq. 3)}$$

where the equality holds if and only if (iif):

$$f^* = \log(p/q) \in \mathcal{H} \quad \text{(Eq. 4)}$$

The bound of equation 3 is referred to herein as the DV bound. The second variational representation is provided by the equation 5 below:

$$KL(P, Q) \geq D_f^{\mathcal{H}}(P, Q) = 1 + sup\{\mathbb{E}_{x\sim P} f(x) - \mathbb{E}_{x\sim Q} e^{f(x)} : f \in \mathcal{H}\} \quad \text{(Eq. 5)}$$

with equality iif:

$$f^* = \log(p/q) \in \mathcal{H}. \quad \text{(Eq. 6)}$$

The bound provided by equation 5 above is referred to herein as the $f$-div bound (as in $f$-divergence). From equations 3 and 5 indicate that the variational bounds estimate the log-likelihood ratio $f^* = \log(p/q)$, and the tightness of the bound depends on the representation power of H. In order to compare these two lower bounds, observe that $\log(t) \leq t-1$, $t>0$. Therefore, $$\log(\mathbb{E}_{x\sim Q} e^{f(x)})^* \leq \mathbb{E}_{x\sim Q} e^{f(x)} - 1 \quad \text{(Eq. 7)}$$

$$KL(P, Q) \geq D_{DV}^{\mathcal{H}}(P, Q) \geq D_f^{\mathcal{H}}(P, Q) \quad \text{(Eq. 8)}$$

Equation 8 indicates that the DV bound is tighter than the f-div bound.

Now, given samples $\{x_i, i=1 \ldots N, x_i \sim P\}$, $\{y_i, i=1 \ldots N, y_i \sim Q\}$, in one embodiment, the KL divergence can be estimated by computing the variational bound from Monte-Carlo simulation. Specifically, in one embodiment, the following estimator can be used for the DV bound:

$$\hat{D}_{DV}^{\mathcal{H}}(P, Q) = sup\left\{\frac{1}{N}\sum_{i=1}^{N} f(x_i) - \log\left(\frac{1}{N}\sum_{i=1}^{N} e^{f(th)}\right) : f \in \mathcal{H}\right\} \quad \text{(Eq. 9)}$$

Note that the Mutual Information Neural Estimator (MINE) considered the above formulation with the hypothesis class H being a neural network. For the f-div bound we have similarly the following estimator:

$$\hat{D}_f^{\mathcal{H}}(P, Q) = 1 + sup\left\{\frac{1}{N}\sum_{i=1}^{N} f(x_i) - \frac{1}{N}\sum_{i=1}^{N} e^{f(th)} : f \in \mathcal{H}\right\} \quad \text{(Eq. 10)}$$

While DV bound is tighter than the f-div bound, in order to learn the function $f$ using stochastic gradient optimization, f-div is a better fit because the cost function is linear in the expectation, whereas in the DV bound we have a log non-linearity being applied to the expectation. This non-linearity can introduce biases in the mini-batch estimation of the cost function. In one aspect, what is discussed herein is how to alleviate this problem and remove the non-linearity at the cost of an additional auxiliary variable that will enable better optimization for the DV bound, sometimes referred to herein as an η-trick for the DV bound.

We start with the following Lemma, that gives a variational characterization of the log.

Lemma 1. Let x>0, we have: $\log(x) = \min_\eta e^{-\eta} x + \eta - 1$.

Using Lemma 1 we can now linearize the log in the DV bound.

Lemma 2. Let H be any function space mapping X to R.

$$KL(P, Q) \geq D_{\eta\text{-}DV}^{\mathcal{H}}(P, Q) = -inf\{L(f, \eta) : f \in \mathcal{H}, \eta \in \mathbb{R}\} \quad \text{(Eq. 11)}$$

$$L(f, \eta) = e^{-\eta} \mathbb{E}_{x\sim Q} e^{f(x)} - \mathbb{E}_{x\sim P} f(x) + \eta - 1 \quad \text{(Eq. 12)}$$

Equation 11 is referred to herein as the η-DV bound. Note that for η=0 we recover the f-div bound. Using Lemma 2, we can now rewrite the estimator for the DV bound in Eq. 9 as follows:

$$\hat{D}_{DV}^{\mathcal{H}}(P, Q) = -inf_{f, \eta} \hat{L}(f, \eta) \quad \text{(Eq. 13)}$$

Where $$\hat{L}(f, \eta) = e^{-\eta} \frac{1}{N} \sum_{i=1}^{N} e^{f(y_i)} - \sum_{i=1}^{N} f(x_i) + \eta - 1 \quad \text{(Eq. 14)}$$

Figure 3:
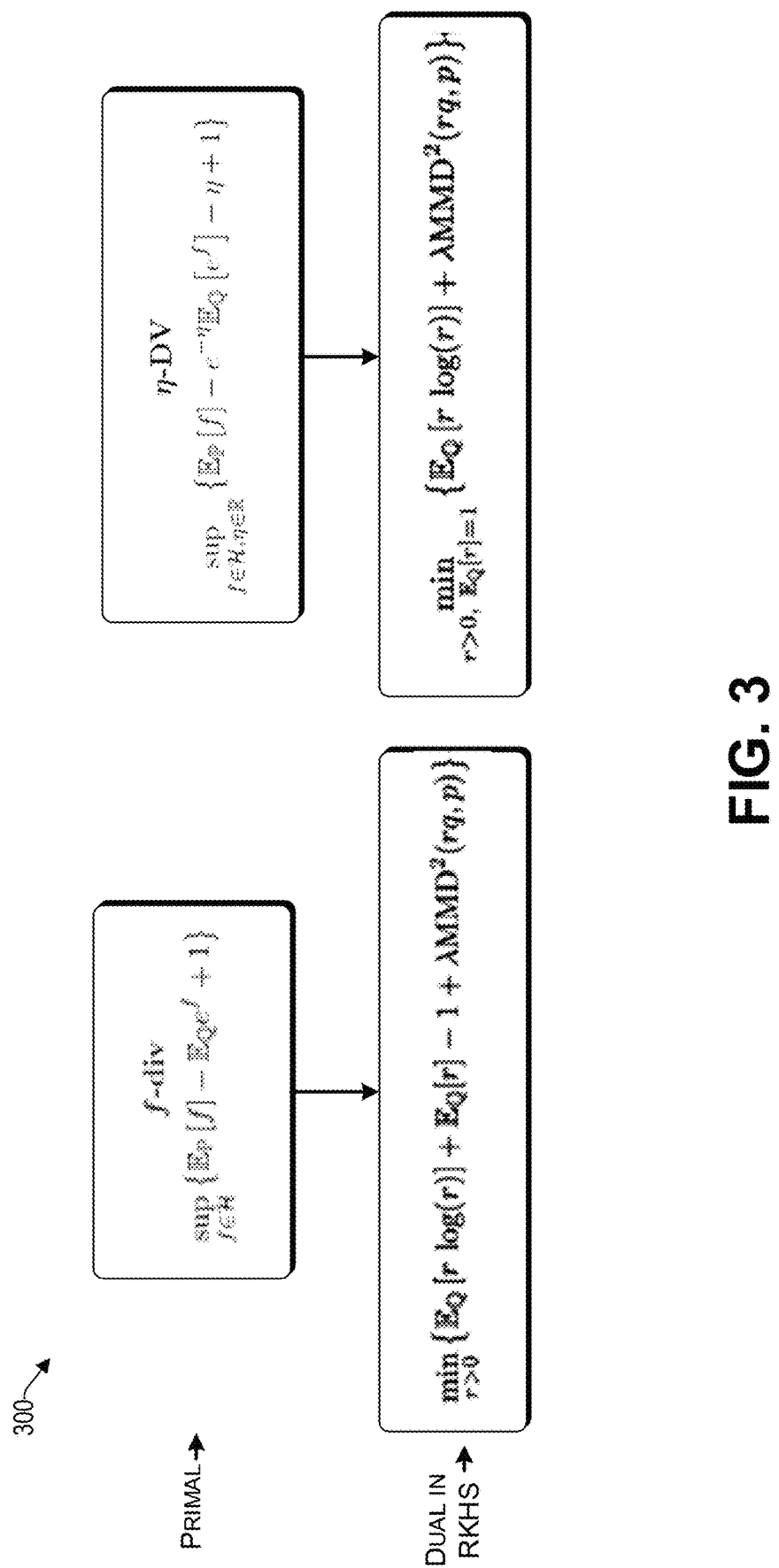
FIG. 3 is a block diagram that provides a comparison between $f$-div and $\eta$-DV, consistent with an illustrative embodiment.

Equation 13 enables unbiased stochastic gradient optimization of the function $f$.

η-DV Bound, Convexity, Maximum Mean Discrepancy (MMD) Ratio Estimates, and Lagrangians In our discussion above it was established that the DV bound is tighter than the f-div and derived η-DV as an alternative to DV, enabling unbiased stochastic optimization. However, the role of η in improving the lower bound remains unclear. To highlight its role, we consider the η-DV bound from Eq. 11, and restrict the hypothesis function class to an RKHS. We can compare η-DV estimator to the f-div estimator and further understand this hierarchy of lower bounds. In this regard, reference now is made to FIG. 3, which is a block diagram 300 that provides a comparison between $f$-div and η-DV, consistent with an illustrative embodiment. In FIG. 3, r is an estimator for density ratio p/q and $MMD_\Phi(P, Q) = \mathbb{E}_{x\sim P} \Phi(x) \mathbb{E}_{y\sim Q} \Phi(y)$. As can be seen, both duals have a relative entropy term, but the $f$-div bound does not impose the normalization constraint on the ratio, which biases the estimate, while η-DV uses 17 as the Lagrangian multiplier to impose the constraint $\mathbb{E}_Q[r]=1$ and ensure density normalization. For simplicity, and without loss of generality, we let RKHS be a finite dimensional feature map, i.e., $$\mathcal{H} = \{f | f(x) = \langle w, \Phi(x) \rangle, \Phi : X \to \mathbb{R}^m, w \in \mathbb{R}^m\} \quad \text{(Eq. 15)}$$

Now for $f \in H$, the loss given in Eq. 12 for η-DV can be rewritten as follows:

$$L(f, \eta) \triangleq L(w, \eta) e^{-\eta} \mathbb{E}_{x \sim Q} e^{\langle w, \Phi(x) \rangle} - \langle w, \mathbb{E}_{x \sim P} \Phi(x) \rangle + \eta - 1 \quad \text{(Eq. 16)}$$

We consider the following regularized loss: $\mathcal{L}(w, \eta) = L(w, \eta) + \Omega(w)$, and the corresponding sample-based formulation $$\hat{\mathcal{L}}(w, \eta) = \hat{L}(w, \eta) + \Omega(w)$$

where $\Omega(w)$ is a convex regularizer, e.g., $$\Omega(w) = \frac{\lambda}{2} \|w\|_2^2$$

The $\eta$-DV primal problem can now be defined as:

$$\eta\text{-}DV - P{:}\min_{w,\eta} L(w, \eta) + \Omega(w) \quad \text{(Eq. 17)}$$

The discussion below explains that $L(w, \eta)$ is jointly convex in $(w, \eta)$ and derive its dual, which will shed light on the nature of the likelihood ratio estimate as well as the role of $\eta$. In Lemma 3 we first establish the convexity of the $\eta$-DV loss function.

Lemma 3. $\mathcal{L}$ and $\hat{\mathcal{L}}$ are jointly convex in $w$ and $\eta$.

$$\hat{\mathcal{L}}_\varepsilon(u, \eta) = \hat{L}(u, \eta) + \Omega(u) + \varepsilon e^{-\eta} \quad \text{(Eq. 18)}$$

Accordingly, the KL estimate is therefore given as follows:

$$\hat{D}_{DV}^{\mathcal{H}}(P, Q) = -\hat{L}(w^*, \eta^*) \quad \text{(Eq. 19)}$$

Where $(w^*, \eta^*) = \arg\min_{(u,\eta)} \hat{\mathcal{L}}_\varepsilon(u, \eta) \quad \text{(Eq. 20)}$ In another embodiment, a way of estimating the KL divergence is through a likelihood ratio estimation. Given a ratio estimate $\hat{r}$ of p/q, the KL divergence can be computed as $E_Q \hat{r} \log(\hat{r})$, which can be easily estimated using samples from Q.

Theorem 1 below shows that the dual problem (denoted D), corresponding to the primal minimization problem (denoted P) of $\eta$-DV, reduces to a constrained likelihood ratio estimation problem (denoted C).

Theorem 1: Let $\Omega^*(\cdot)$ be the Fenchel conjugate of $\Omega(\cdot)$. The $\eta$-DV bound restricted to an RKHS, amounts to the following regularized convex minimization: $P=(\min_{w,\eta} L(w, \eta) + \Omega(w))$, that has the following dual form:

$$D = \min_{r>0} \max_{\eta} \int_{\mathcal{X}} r(y) \log(r(y)) q(y) dy + \quad \text{(Eq. 21)}$$

$$(\eta - 1)\left(\int_{\mathcal{X}} r(y)q(y)dy - 1\right) + \Omega^*(\Delta(r))$$

where $\Delta(r) = \int_{\mathcal{X}} \Phi(x)p(x)dx - \int_{\mathcal{X}} r(y)q(y)\Phi(y)dy.$ Noticing that $\eta-1$ plays the role of a Lagrangian multiplier, this is equivalent to the following likelihood ratio estimation problem:

$$C = \quad \text{(Eq. 22)}$$

$$\min_{r>0} \int_{\mathcal{X}} r(y)\log(r(y))q(y)dy + \Omega^*\left(\int_{\mathcal{X}} \Phi(x)p(x)dx - \int_{\mathcal{X}} r(y)q(y)\Phi(y)dy\right)$$

$$\text{subject to: } \int_{\mathcal{X}} r(y)q(y)dy = 1.$$

Therefore, we have P=D=C. Let $(w^*, \eta^*)$X an optimizer of P. Let $r^*$ be an optimizer of D, then KL estimate is given by the equation below:

$$D_{DV}^{\mathcal{H}}(P, Q) = \int_{\mathcal{X}} r^*(y)\log(r^*(y))q(y)dy = L(w^*, \eta^*) \quad \text{(Eq. 23)}$$

The regularizer $$\Omega(\omega) = \frac{\lambda}{2}\|\omega\|^2$$

can now be given the following interpretation based on the results of Theorem 1. It is noted that the definition of the MMD between distributions using an RKHS: $\text{MMD}_\Phi(P, Q) = \|E_{x \sim P}\Phi(x) - E_{y \sim Q}\Phi(y)\|$. Replacing the Fenchel conjugate $\Omega^*(\cdot)$ by its expression in Theorem 1, we see that $\eta$-DV is equivalent to the following dual ($\eta$-DV-D):

$$\eta\text{-}DV - D{:}\min_{r>0}\max_{\eta} \int_{\mathcal{X}} r(y)\log(r(y))q(y)dy + \quad \text{(Eq. 24)}$$

$$(\eta - 1)\left(\int_{\mathcal{X}} r(y)q(y)dy - 1\right) + \frac{1}{2\lambda}\text{MMD}_\Phi^2(rq, p)$$

Equation 24 can be written as a constrained ratio estimation problem ($\eta$-DV-C):

$$\eta\text{-}DV - C{:}\min_{r>0} \int_{\mathcal{X}} r(y)\log(r(y))q(y)dy + \frac{1}{2\lambda}\text{MMD}_\Phi^2(rq, p), \quad \text{(Eq. 25)}$$

$$\text{subject to: } \int_{\mathcal{X}} r(y)q(y)dy = 1$$

Accordingly, the foregoing theorem demonstrates that the $\eta$-DV optimization problem is equivalent to the constrained likelihood ratio estimation problem r given in Eq. 25, where the ratio is estimated using the MMD distance in the RKHS between rq and p. It is also noted that p/q is a feasible point and for the universal feature map $\text{MMD}_\Phi(rq, p)=0$ iif r=p/q. Therefore, for a universal kernel, p/q is optimal and we recover the KL divergence for r=p/q. When comparing $\eta$-DV-D from Eq. 24 and $\eta$-DV-C from Eq. 25, we see that $\eta-1$ plays the role of a Lagrangian that ensures that rq is indeed a normalized distribution. In practice, we solve the primal problem (P), while the dual problem (D) and its equivalent constrained form (C) explain why this formulation estimates the KL divergence and the role of $\eta$ as a Lagrangian multiplier that enforces a normalization constraint. Let $r^*$ be the solution, then we have $$\hat{D}_{f\mathcal{H}}^{\mathcal{H}}(\mathbb{P},\mathbb{Q}) = \int_{\mathcal{X}} r^*(y)\log(r^*(y))q(y)dy = -L(w^*, \eta^*) \quad \text{(Eq. 26)}$$

For comparison, the f-div bound, restricted to an RKHS, is equivalent to the following ratio estimation (which follow from the proof of Theorem 1 by eliminating max on $\eta$, and setting $\eta$=0).

$$f\text{-div:}\min_{r>0} \int_{\mathcal{X}} r(y)\log(r(y))q(y)dy + \quad \text{(Eq. 27)}$$

$$1 - \int_{\mathcal{X}} r(y)q(y)dy + \frac{1}{2\lambda} MMD_\Phi^2(rq, p)$$

Let r* be the optimum, then the KL divergence can be estimated as follows:

$$\hat{D}_f^{\mathcal{H}}(\mathbb{P},\mathbb{Q}) = \int_{\mathcal{X}} r^*(y)\log(r^*(y))q(y)dy + \left(1 - \int_{\mathcal{X}} r^*(y)q(y)dy\right) \quad \text{(Eq. 28)}$$

Comparing $\hat{D}_{DV}^{\mathcal{H}}(\mathbb{P},\mathbb{Q})$ and $\hat{D}_f^{\mathcal{H}}(\mathbb{P},\mathbb{Q})$, it is noted that they both have a relative entropy term, but the f-div bound does not impose the normalization constraint on the ratio, which biases the estimate. In Theorem 1, if the loss L is replaced by its empirical counterpart L from equation 13 hereinabove, the equivalent Dual takes the following form:

$$\min_{r_i>0} \frac{1}{N}\sum_{i=1}^{N} r_i \log(r_i) + \Omega^*\left(\frac{1}{N}\sum_{i=1}^{N}\Phi(x_i) - \frac{1}{N}\sum_{i=1}^{N} r_i\Phi(y_i)\right), \quad \text{(Eq. 29)}$$

$$\text{subject to}: \frac{1}{N}\sum_{i=1}^{N} r_i = 1$$

The KL estimate is given by the expression below:

$$\hat{D}_{DV}^{\mathcal{H}}(\mathbb{P},\mathbb{Q}) = \frac{1}{N}\sum_{i=1}^{N} r_i^* \log(r_i^*) = -\hat{L}(w^*, \eta^*) \quad \text{(Eq. 30)}$$

One shortcoming of the RKHS approach is that the method depends on the choice of feature map $\Phi$. The teachings herein propose to learn $\Phi$ as a deep neural network as in MINE. Given samples $x_i$ from P, $y_i$ from Q, the KL estimation problem becomes:

$$\hat{D}_{DV}^{NN}(\mathbb{P},\mathbb{Q}) = -\left(\min_{\Phi}\min_{\eta,w} e^{-\eta}\frac{1}{N}\sum_{i=1}^{N} e^{\langle w,\Phi(y_i)\rangle} - \sum_{i=1}^{N}\langle w, \Phi(x_i)\rangle + \eta - 1\right) \quad \text{(Eq. 31)}$$

Eq. 31 can be solved using BCD on $(w, \eta, \Phi)$. Note that if $\Phi(\bullet)$ is known and fixed, then optimization problem in Eq. 31 becomes convex in $\eta$ and w. We refer to this bound as $\eta$-DV-convex.

The following observations can be made. First, regarding ratio estimation via feature matching, KL divergence estimation with variational bounds is a ratio estimation using a form of MMD matching. Second, the choice of the feature space or the architecture of the neural network introduces a bias in the ratio estimation. Third, regarding Ratio Normalization, $\eta$-DV bound introduces a normalization constraint on the ratio, that provides a better consistent estimate. Fourth, the choice of the regularizer dictates the choice of the metric.

We now specify the KL estimators (discussed above) for the MI estimation problem. Given a function space H defined on X×Y, $$I(X;Y) \geq I_{DV}^{\mathcal{H}}(X;Y) = \quad \text{(Eq. 32)}$$

$$\sup_{f\in\mathcal{H}} \mathbb{E}_{p_{xy}} f(x,y) - \log(\mathbb{E}_{p_x}\mathbb{E}_{p_y} e^{f(x,y)}) \geq I_{f\text{-div}}^{\mathcal{H}}(X;Y)$$

Where $$I_{f\text{-div}}^{\mathcal{H}}(X;Y) = \sup_{f\in\mathcal{H}} \mathbb{E}_{p_{xy}} f(x,y) - \mathbb{E}_{p_x}\mathbb{E}_{p_y} e^{f(x,y)} \quad \text{(Eq. 33)}$$

Equivalently, with the $\eta$-trick we have:

$$I_{DV}^{\mathcal{H}}(X;Y) = -\inf_{f\in\mathcal{H},\eta} e^{-\eta}\mathbb{E}_{p_x p_y} e^{f(x,y)} - \mathbb{E}_{p_{xy}} f(x,y) + \eta - 1 \quad \text{(Eq. 34)}$$

Accordingly, equation 34 demonstrates that the log term of Eq. 32 is removed, thereby substantially reducing the computational complexity of the computing device performing the MI calculation. Indeed, given iid samples from marginals $x_i \sim p_x$ and $\tilde{y}_i \sim p_y$, i=1 . . . N, and samples from the joint $(x_i, y_i) \sim p_{xy}$, i=1 . . . N, the MI can be estimated as follows:

$$\hat{I}_{DV}^{\mathcal{H}}(X;Y) = \quad \text{(Eq. 35)}$$

$$\hat{D}_{DV}^{\mathcal{H}}(p_{xy}, p_x p_y) = -\inf_{f\in\mathcal{H},\eta} e^{-\eta}\frac{1}{N}\sum_{i=1}^{N} e^{f(x_i,\tilde{y}_i)} - \frac{1}{N}\sum_{i=1}^{N} f(x_i, y_i) + \eta - 1$$

When H is an RKHS, $\eta$ can be seen as a Lagrangian ensuring that the ratio estimation $r(x, y)$ of $p_{xy}/p_x p_y$ is normalized when integrated on $p_x p_y$, i.e., $\eta$ is a Lagrangian associated with the constraint $$\int_{\mathcal{X}\times\mathcal{Y}} r(x,y)p_x(x)p_y(y)dxdy = 1.$$

In this regard, FIG. 4 illustrates a table 400 (i.e., Table 1), which provides variational bounds for MI based on f-div, DV, and $\eta$-DV bounds. Table 1 indicates that given iid samples from marginals $x_i \sim p_x$ and $\tilde{y}_i \sim p_y$ and samples from the joint $(x_i, y_i) \sim p_{xy}$, we list some MI estimators, corresponding variational bounds, associated losses, and constraints on the function space. In one embodiment, MI estimators include biased and unbiased DV-MINE from DV, f-MINE from f-div, InfoNCE (Informational Noise Contrastive Estimator), a-MINE from DV and $\eta$-MINE, $\eta$-MINE-convex from $\eta$-DV (based on the teachings herein).

Lemma 4: For any function g that maps X×Y to R+ we have:

$$KL(p_{x,y}, p_x p_y) + \mathbb{E}_{p_x} \log(\mathbb{E}_{p_y} g(x,y)) \geq \mathbb{E}_{p_{xy}} \log(g(x,y)) \quad \text{(Eq. 36)}$$

Accordingly: $I(X;Y) = \sup_{f \in G(X \times Y)} E_{px,y} f(x, y) - E_{py} \log(E_{px} e^{f(x,y)})$ where G (X×Y) is the entire space of functions defined on X×Y. For any function space H map X×Y to R there is the following:

$$I(X; Y) \geq I_{\infty-IW}^{\mathcal{H}}(X; Y) := \sup_{f \in \mathcal{H}} \mathbb{E}_{p_{x,y}} f(x, y) - \mathbb{E}_{p_y} \log(\mathbb{E}_{p_x} e^{f(x,y)}) \quad \text{(Eq. 37)}$$

Using Jensen's inequality, the following hierarchy of lower bounds is provided:

$$I(X;Y) \geq I_{\alpha-DV}^{\mathcal{H}}(X;Y) \geq I_{\eta-DV}^{\mathcal{H}}(X;Y) \geq I_{f-div}^{\mathcal{H}}(X;Y) \quad \text{(Eq. 38)}$$

In Theorem 2, the η-trick of Lemma 1 to $I_{\alpha-DV}^H(X; Y)$ is applied, where each log term (e.g.

$$\left(\mathbb{E}_{p_x} e^{f(x,y)}\right)$$

is replaced using the variational form of low, which leads to η(y).

Theorem 2 (η-trick for Improved $DV_xB_y$ound). Let H be a space of bounded functions defined on X×Y we have $I(X; Y) \geq \inf_{f \in H, \eta \in G(Y)} E_{px,py} e^{f(x,y)-\eta(y)} + E_p \eta(y) - 1 - E_{pxy}(\eta(x, y))$, where G (Y) is the entire space of functions defined on Y. Let $H_\eta$ be a function space subset of G (Y), the following expression is obtained:

$$I(X;Y) \geq I_{\eta-DV}^{\mathcal{H}}(X;Y) :=$$
$$\sup_{f \in \mathcal{H}, \eta \in \mathcal{H}_\eta} \mathbb{E}_{p_{x,y}} f(x,y) - \mathbb{E}_{p_x,p_y} e^{f(x,y)-\eta(y)} - \mathbb{E}_{p_y} \eta(y) + 1$$

Accordingly, we recover the lower bound given in Table 1 of FIG. 4 (i.e., a-Mine, which was derived through other variational principles. In the following, we make a few remarks about $I_{\alpha-DV}^H(X; Y)$. First, in one embodiment, the $I_{\alpha-DV}^H(X; Y)$ bound can be also obtained by setting $\eta(y) = \log(a(y))$, $a(y) > 0$. While this seems equivalent, the restriction of a to $R^+$ (η is in R) changes the landscape of the optimization problem and the interchangeability principle does not apply in a straightforward way.

Second, as discussed above, in the embodiment where we restrict H to an RKHS, η(y) plays a role of a Lagrangian multiplier or a dual potential in a ratio estimation problem. In this embodiment, the Lagrangian multiplier is enforcing multiple constraints $$\int_X r(x, y) p(x) dx = 1$$

for each y, instead of imposing a single constraint $$\int_X \int_y r(x, y) p(x) p(y) dx dy = 1$$

as in the $I_{\alpha-DV}^H(X; Y)$ bound.

Third, while $I_{\alpha-DV}^H(X; Y)$ may be tighter than the $I_{\eta-DV}^H(X; Y)$, it may come at the price of estimating a function η(y) together with the witness function ƒ. This triggers a higher computational cost and larger estimation errors. Stated differently, the MI provided herein provides results that are more precise and involve less computational resources. It is also noted that $I_{\alpha-DV}^H(X; Y)$ can be extended to conditional MI estimation. Further, the η-DV bound discussed herein is applicable for general probability distributions P and Q: $KL(P, Q) \geq D_{\eta-DV}^H(X; Y)$ generally is applicable to $P = p_{xy}$ and $Q = p_x p_y$. In this regard, reference is made to FIG. 5, which provides an example algorithm 500 outlining a process of η-MINE for MI estimation.

Example Use Cases

With the foregoing mathematical explanation of the accuracy and reduced computational complexity of the MI estimation discussed herein, it may be helpful to provide some example use cases. In various scenarios, synthetic and/or real data can be used on a number of applications to compare the proposed η-MINE MI estimator to some existing baselines. In one example, different MI estimators are compared on three synthetically generated Gaussian datasets (e.g., 5K training and 1K testing samples). By way of example and not by way of limitation, each evaluated MI estimator was run 10 times for a 2-D, 10-D and 20-D gaussian. Thus, data was sampled from 2, 10, and 20-dimensional Gaussian distributions with randomly generated means and covariance matrices. As the data complexity is increased, the divergence between estimators decreases, although applicants observed that η-MINE on average performed better than the baseline methods, converging to the true MI [red line] faster.

It will be understood that MI estimation in high D (dimensions) is a challenging task, where the estimation error for all methods increases as the data dimensionality grows. Nevertheless, simulations have shown that the proposed η-MINE is able to achieve on average more accurate results compared to the existing baselines. It was also observed that the convex formulation of η-MINE has overall a better performance and fast convergence rate. This estimator has a linear witness function that is defined as $f(\bullet) = w$, $\phi(\bullet)$ using pre-trained fixed feature map $\phi(\bullet)$ from the regular η-MINE. In the experiments that follow the proposed estimator η-MINE was compared to DV-MINE, as a main baseline approach.

MI-regularized GAN. We investigate GAN training improvements with MI, and especially diminishing mode collapse. By way of example and not by way of limitation, conditional generator G is supplied with random codes c along with noise z. The mutual information between I(G(z, c), c) is maximized using η-MINE estimators. The task is repeated to the 10-D gaussian, where it is established that η-MINE can recover all the modes within fewer steps than DV-MINE (i.e., 50K vs. 140K) and with a stable training. For example, as used herein, stable relates to, as training progresses, the loss is continuously decreasing. During unstable training, the loss can increase or fluctuate up and down with large magnitude.

Figure 6:
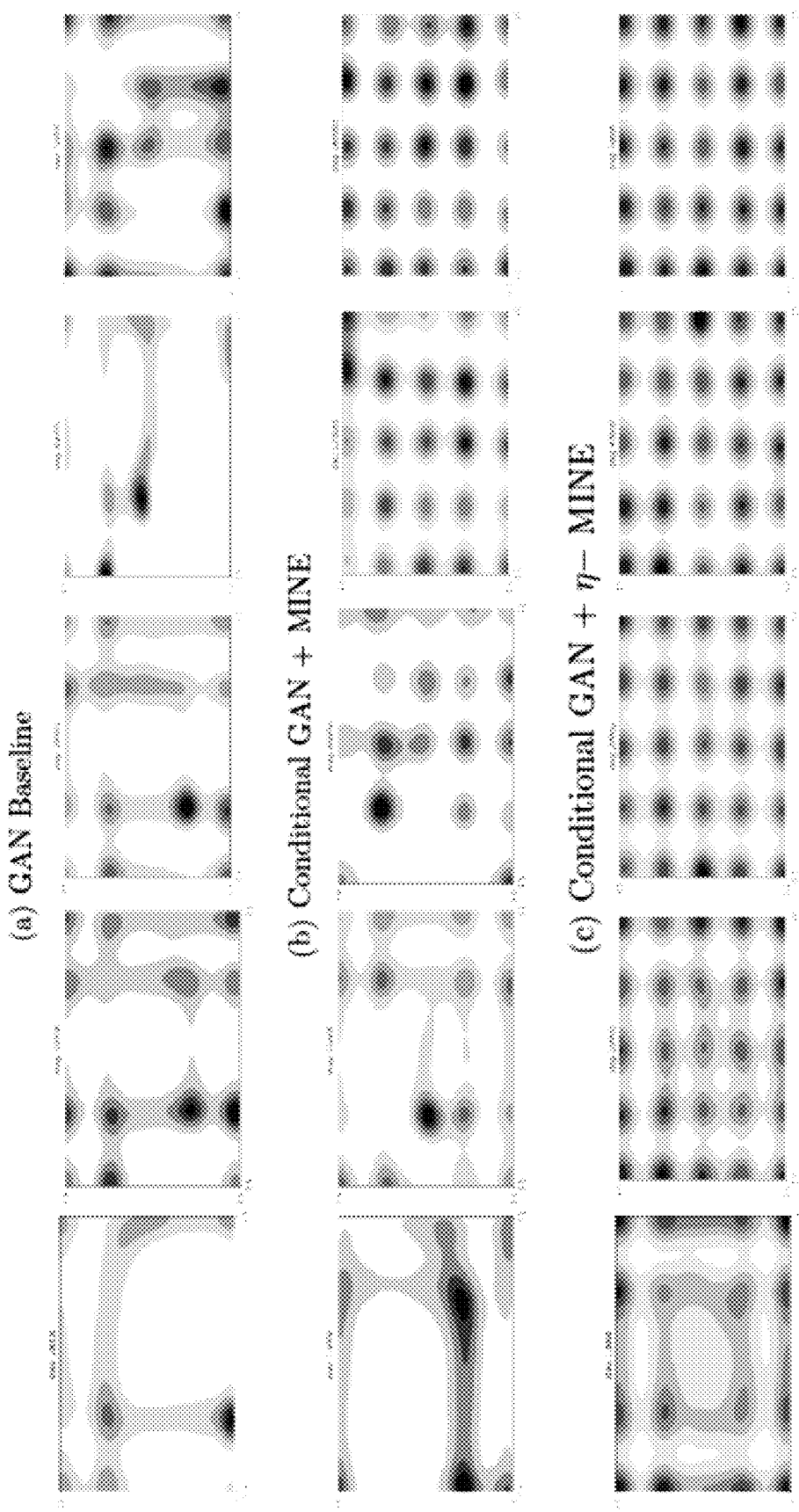
FIG. 6 is a diagram illustrating MI-regularized GAN using different approaches.

FIG. 6 is a diagram illustrating MI-regularized GAN using different approaches. The top row in FIG. 6 indicates that unconditional GAN baseline fails at capturing all 25 modes in the Gaussian mixture. The middle row indicates that MI-regularized conditional GAN using DV-MINE converges after 140K steps of the generator. Applicants have determined that this estimator to be sensitive to the hyperparameters and to be unstable during training. The bottom row reflects the teachings herein, where an MI-regularized conditional GAN using an η-MINE estimator. As illustrated, in the bottom row of FIG. 6, the model converges in 50K steps of the generator.

Figures 7A, 7B, 7C, 7D:
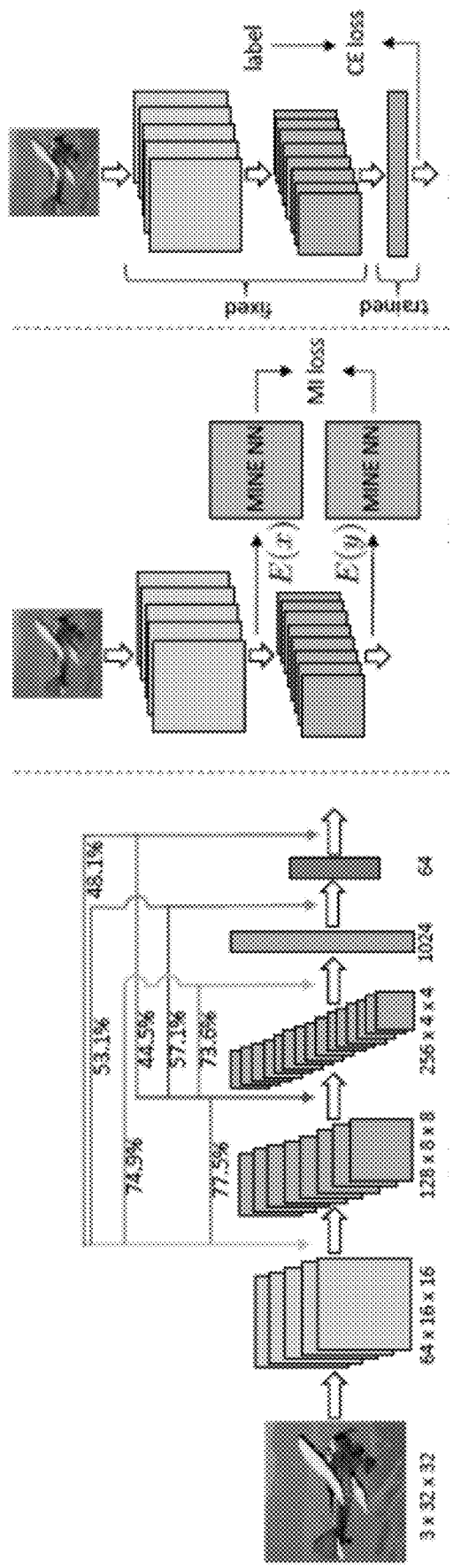
FIGS. 7A to 7C illustrate an encoder architecture and classification accuracy for different pre-trained encoders.
FIG. 7D illustrates a Table providing the results for two MI estimators, namely $\eta$-MINE and DV-MINE, whose loss functions are listed in Table 1 of FIG. 4.

Self-supervised: Deep InfoMax. In one embodiment, the teachings herein can be applied to unsupervised or self-supervised learning. For example, in unsupervised learning, machine learning computing device 102 of FIG. 1 does not receive any labels as what is acceptable, rather, it simply receives historic data, sometimes referred to as training data, that can be used by the machine learning computing device 102 to find its own structure among the data. In self-supervised learning the training data is autonomously (or automatically) labelled. It is still supervised learning, but the datasets do not need to be manually labelled (e.g., by a human), but they can be labelled by finding and exploiting the relations (or correlations) between different input signals (e.g., input coming from different sensor modalities). In unsupervised or self-supervised learning, the objective is to build a model without relying on labeled data but using an auxiliary task to learn informative features that can be useful for various downstream tasks. In this embodiment we evaluate the effectiveness of the proposed η-MINE estimator for unsupervised feature learning using a recently proposed (i.e., known) Deep InfoMax (DIM). In one embodiment, for feature representation, an encoder such as a deep convolutional generative adversarial network (DCGAN) is used. In this regard, reference is made to FIGS. 7A to 7C, which illustrate an encoder architecture and classification accuracy for different pre-trained encoders. For example, a CIFAR-10 dataset can be used. Each number represents test accuracy of the system trained by maximizing MI between features from layers pointed by the corresponding arrows. Interestingly, the highest accuracy was obtained by pre-training encoder comprising just the first two convolutional layers, as illustrated in FIGS. 7B and 7C. More specifically, FIG. 7B illustrates a block diagram of model pre-training by maximizing MI between features from different layers (e.g., additionally transformed by a neural net, aimed at constructing witness function f (•)]. FIG. 7C is a block diagram of, after pre-training, the encoder being fixed and a trainable linear layer attached thereto to perform traditional supervised training on the same or different datasets.

The encoder is trained by maximizing MI I(x', y') between features from one of the shallow layers 1 (x'=$E_l$(x)) and a deeper layer k (y'=$E_k$(y)). Applicants examined different layer combinations and found that the encoder comprising of only the first two convolutional layers provides the best performance on the downstream tasks. As shown in FIG. 7B, the encoder features are passed through additional trainable neural network layers, whose function is to build a classifier f(x', y'), discriminating cases when x' and y' come from the same image, and cases when x' and y' are unrelated.

As illustrated in FIG. 7C, a linear layer is attached to the pre-trained and now fixed encoder to perform supervised training. In this regard, FIG. 7D illustrates a Table (i.e., Table 2) providing the results for two MI estimators, namely η-MINE and DV-MINE, whose loss functions are listed in Table 1 of FIG. 4. In Table 2, the classification accuracy (top1) results on CI-FAR10 (C10) and STL10 (S10) for unsupervised pre-training task with DV-MINE and η-MINE using encoder in FIG. 6B. For reference, the results for supervised (CE) training using the full encoder in FIG. 6A is provided. As illustrated, η-MINE-based pre-training achieves overall better results when evaluated on same or different data, even outperforming the supervised model on S10. As illustrated in Table 2, η-MINE-based pre-training performs competitively with DV-MINE, achieving overall better results on both datasets, showing practical benefits of the proposed approach.

Figures 8A, 8B:
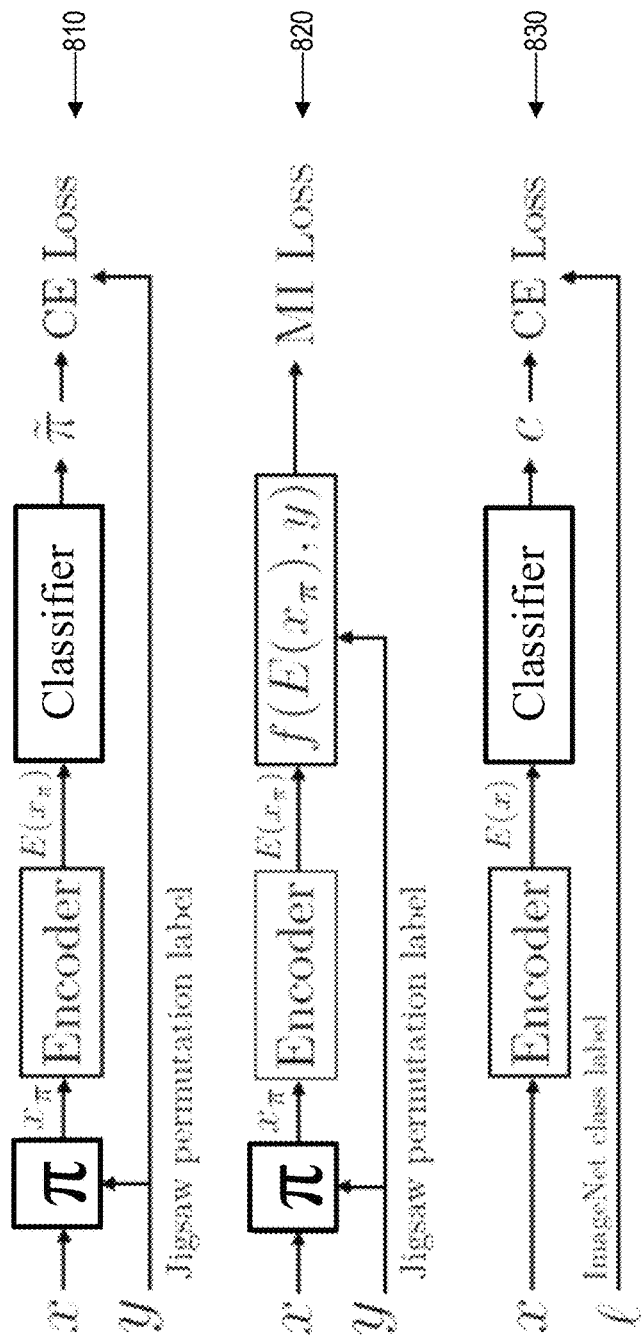
FIG. 8A illustrates Jigsaw training, Jigsaw MI training, and ImageNet classification.
FIG. 8B provides a table where the models of FIG. 8A are compared.

Self-Supervised: Jigsaws with MI. In one embodiment, a self-supervision Jigsaw pretext task aims at solving an image jigsaw puzzle by predicting the scrambling permutation 7E. In this regard, reference is made to FIG. 8A, which illustrates Jigsaw training 810, Jigsaw MI training 820, and ImageNet classification 830. From image X with x={$x_1$ ... $x_9$}3×3 jigsaw patches, and permutation y=$\pi_i$: [1, 9]→[1, 9], scrambled patches $x_{\pi_i}$={$x_{\pi_i(1)}$ ... $x_{\pi_i(9)}$} generate the puzzle. Each patch is passed through an encoder E, which learns meaningful representations such that a classifier $C_J$ can solve the puzzle by predicting the scrambling order $\pi_i$, as illustrated in FIG. 8, row 810. While this standard formulation relies on a CE-based classification of the permutation, what is proposed herein is to use MI Jigsaw, where machine learning computing device 102 of FIG. 1 trains the encoder E to maximize I(E($x_{\pi_i}$);$\pi_i$) by using MI estimators DV- and η-MINE, as illustrated in FIG. 8, row 820. A patch preprocessing avoids shortcuts based on color aberration, patch edge matching, etc. This is a larger set than Tiny ImageNet (e.g., 200 classes) used in many publications. E is a ResNet50 for all our experiments. In our ImageNet target classification task, E from CE and MI Jigsaw trainings are frozen (at 200 epochs) and followed by linear classifier C (FIG. 8, row 830).

FIG. 8B provides a table (i.e., Table 3) where the models of FIG. 8A are compared. In Table 3, the classification accuracy is provided in percentages. Model A is a supervised baseline, and model B is A with a CE Jigsaw pretrained Encoder. DV-MINE and η-MINE use a fixed encoder from MI training, as depicted in FIG. 8A. In Table 3, CE refers to a CE Jigsaw Encoder. Applicants have determined that the best accuracy numbers are reported for Cs trained for exactly 200 epochs. For all results, E is trained from Jigsaw task (CE or MI) and frozen, with only C trained. DV- and η-MINE share the same f architecture. η-MINE gives better accuracy performance compared to DV-MINE. CE model trained from a Jigsaw-supervised encoder E provides an upper-bound for supervised performance for E from the Jigsaw task. Despite CE being better than η-MINE and DV-MINE, η-MINE does a respectable job at learning a useful representation space for the target task, better than DV-MINE.

Example Process

Figure 9:
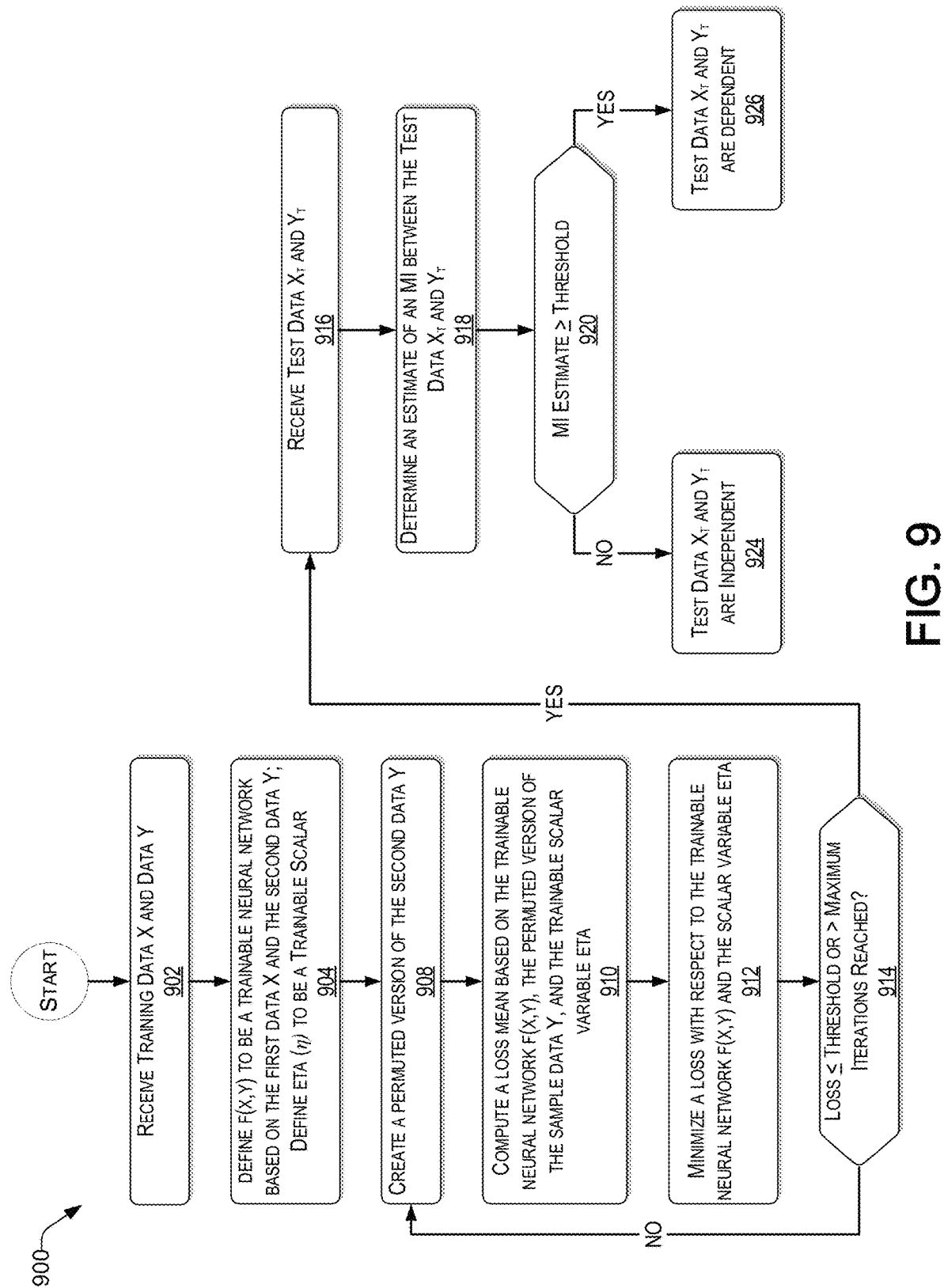
FIG. 9 presents an illustrative process related to determining an MI between two sets of data, consistent with an illustrative embodiment.

With the foregoing overview of the example architecture 100, various building blocks, and mathematical explanations, it may be helpful now to consider a high-level discussion of an example process. To that end, FIG. 9 presents an illustrative process related to determining an MI between two sets of data that may be used by a computing device in the context of, for example, performing a machine learning task. Process 900 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process. For discussion purposes, the process 900 is described with reference to the architecture 100 of FIG. 1.

At block 902, during a training phase, the MI estimator engine 104 of the machine learning computing device 102 receives a first data X having N samples and a second data Y having N samples.

At block 904, the computing device 102 defines a function (i.e., f(x,y)) to be a trainable neural network based on the received first data X and the second data Y. Eta ($\eta$) is defined to be a trainable scalar.

In one embodiment, the computing device 102 determines a similarity between the data X and the second data Y.

At block 908, a permuted version of the second data Y is created by the MI estimator engine 104. For example, the permuted version is a random distribution of the N samples of the second data Y with respect to the N samples of the first data X. Stated differently, the N samples of data Y are randomly rearranged with respect to the N samples of data X.

At block 910, a loss mean is computed by the MI estimator engine 104, based on the trainable neural network f(x,y), the permuted version of the second data Y, and a trainable scalar variable $\eta$. For example, the loss mean is f(x_i, y_i)−exp(−eta) [mean exp [f(x_i, y0_i)]]+$\eta$−1.

At block 912, the MI estimator engine 104 minimizes a loss with respect to the scalar variable $\eta$ and the trainable neural network f(x,y). For example, the loss during this training process is the negative of an MI estimate. The goal is to maximize MI or minimize loss. In one embodiment, the minimization is performed using stochastic gradient descent.

At block 914, the MI estimator engine 104 determines whether the trainable neural network f(x,y), having undergone the minimization of the loss, provides an output that is at or below a predetermined threshold. Upon determining that the trainable neural network f(x,y) is not at or below the predetermined threshold or a threshold number of iterations have not yet been reached (i.e., "NO" at decision block 914), the iterative process returns to block 908 to create a permuted version of the second sample data Y, thereby providing another opportunity to finetune the trainable neural network f(x,y) and eta. In one embodiment, the iterative process is repeated until a predetermined threshold (e.g., number of iterations or time) is met. In one embodiment, the iterative process is based on stochastic optimization (SO).

For example, during this training process, the goal is to avoid using a log term in the calculation because otherwise the log term may bias the result. In this regard, it is noted that training data is used for training (i.e., to estimate f( ) and eta). But once the training is completed, the obtained estimator can be used on new, fresh data to compute the actual MI estimate, referred to herein as test data, as discussed in more detail below. During this computation the MI estimator engine 104 uses the original formula that includes a log term (e.g., equation 3).

Returning to block 914, upon determining that the trainable neural network f(x,y) is at or above the predetermined threshold or a threshold number of iterations have been performed (i.e., "YES" at determination block 914), the process continues with block 916, where the MI estimator engine 104 is promoted from training to testing mode and receives test data $X_T$ and $Y_T$.

At block 918, the MI estimator engine 104 determines an MI between the test data $X_T$ and $Y_T$. For example, the MI estimate is: I(xt, yt)>=mean f(xt_i, yt_i)−log [mean exp [f(xt_i, yt_i)]].

At block 920, the MI estimator engine 104 determines whether the computed MI estimate is at or above a predetermined threshold. If not (i.e., "NO" at decision block 920), the test data $X_T$ and $Y_T$ are deemed to be independent (i.e., at block 924). However, if the MI estimate is at or above the predetermined threshold (i.e., "YES" at decision block 920), the test data $X_T$ and $Y_T$ are deemed to be dependent (i.e., at block 926). For example, at decision block 920, a determination is made whether the test data $X_T$ and the test data $Y_T$ came from joint or marginal probability densities. Based on the MI between the test data $X_T$ and the test data $Y_T$, a corresponding scalar output is provided by the MI estimator engine 104 of the machine learning computing device 102. In one embodiment, upon determining that the similarity is at or above a predetermined threshold, a positive number is provided, and upon determining that the similarity is below the predetermined threshold, a negative number is provided.

Example Computer Platform

Figure 10:
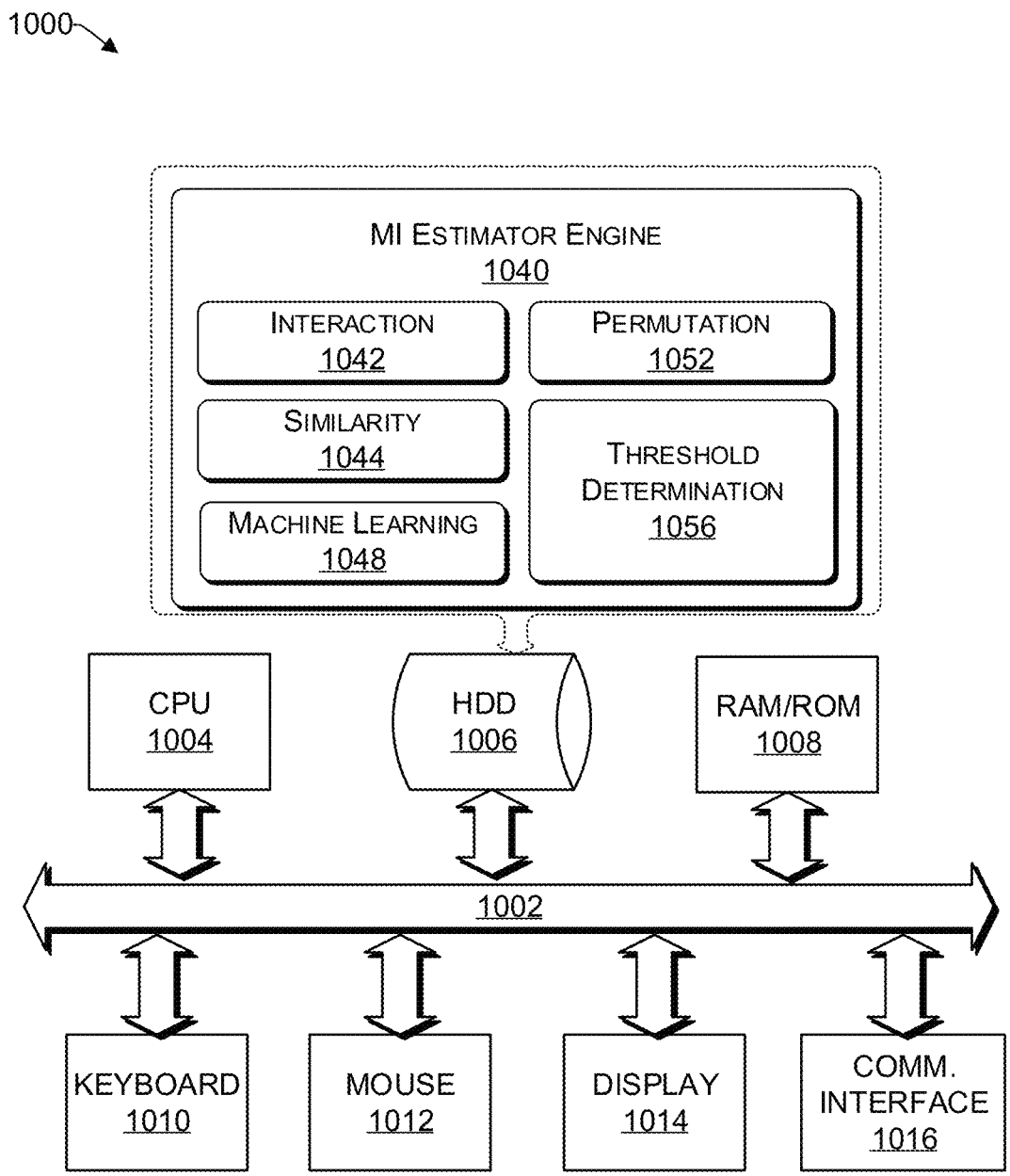
FIG. 10 provides a functional block diagram illustration of a computer hardware platform that can be used to implement a particularly configured computing device that can host a MI estimator engine.

As discussed above, functions relating to efficient and unbiased mutual information estimation for the pair of random variables/features X and Y can be performed with the use of one or more computing devices connected for data communication via wireless or wired communication, as shown in FIG. 1 and in accordance with the process 900 of FIG. 9. FIG. 10 provides a functional block diagram illustration of a computer hardware platform 1000 that can be used to implement a particularly configured computing device that can host a MI estimator engine 640. In particular, FIG. 10 illustrates a network or host computer platform 1000, as may be used to implement an appropriately configured server, such as the machine learning computing device 102 of FIG. 1.

The computer platform 1000 may include a central processing unit (CPU) 1004, a hard disk drive (HDD) 1006, random access memory (RAM) and/or read only memory (ROM) 1008, a keyboard 1010, a mouse 1012, a display 1014, and a communication interface 1016, which are connected to a system bus 1002.

In one embodiment, the HDD 1006, has capabilities that include storing a program that can execute various processes, such as the MI estimator engine 1040, in a manner described herein. The MI estimator engine 1040 may have various modules configured to perform different functions. For example, there may be an interaction module 1042 that is operative to receive raw electronic data from various sources, including electronic data related to variables/features X and Y, as discussed herein.

In one embodiment, there is a similarity module 1044 that is operative to determine similarities between different datasets. Based on the similarity, the similarity module 104 can assign a corresponding scalar score.

There may be a machine learning module 1048 operative to, during a training phase, learn from historical data to build one or more machine learning models that can be used to train various functions, including neural networks. There may be a permutation module 1052 operative to provide a permuted version of received data during an iterative training process. For example, the permuted version may be a random distribution of N samples of data Y with respect to the N samples of data X.

In one embodiment, there is a threshold determination module 1056 operative to determine whether a trainable network has an accuracy that is at or above a predetermined threshold.

In one embodiment, a program, such as Apache™, can be stored for operating the system as a Web server. In one embodiment, the HDD 1006 can store an executing application that includes one or more library software modules, such as those for the Java™ Runtime Environment program for realizing a JVM (Java™ virtual machine).

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
   a processor;
   a storage device coupled to the processor;
   an engine stored in the storage device, wherein an execution of the engine by the processor configures the computing device to perform acts comprising:
   receiving a data X having N samples and a data Y having N samples;
   defining a function f(x,y) to be a trainable neural network based on the data X and the data Y;
   defining $\eta$ to be a trainable scalar variable;
   creating a permuted version of the data Y;
   computing a loss mean based on the trainable neural network f(x,y), a permuted version of a sample of the N samples of data Y, and the trainable scalar variable $\eta$;
   minimizing a loss with respect to the trainable neural network f(x,y) and the trainable scalar variable $\eta$;
   determining whether the trainable neural network f(x,y) having undergone the minimization of the loss provides an output that meets one or more predetermined criteria;
   upon determining that the trainable neural network f(x,y) has not met the one or more predetermined criteria, returning to the act of creating a permuted version of a second sample of the N samples of data Y;
   upon determining that the trainable neural network f(x,y) has met the one or more predetermined criteria:
   receiving test data $X_T$ and $Y_T$;
   estimating a mutual information (MI) between the test data $X_T$ and $Y_T$;
   upon determining that the estimated MI is at or above a predetermined threshold, deeming the test data $X_T$ and $Y_T$ to be dependent; and
   upon determining that the estimated MI is not at or above the predetermined threshold, deeming the test data $X_T$ and $Y_T$ to be independent.

2. The computing device of claim 1, wherein the one or more predetermined criteria comprise at least one of:
   a loss with respect to the trainable neural network f(x,y) and the trainable scalar variable $\eta$ is at or below a predetermined threshold; or
   a maximum number of iterations of minimizing the loss with respect to the trainable neural network f(x,y) and the trainable scalar variable $\eta$ is reached.

3. The computing device of claim 1, wherein the execution of the engine by the processor further configures the computing device to perform an act comprising: determining a similarity between the data X and the data Y by way of KL divergence for various bounds.

4. The computing device of claim 3, wherein the determination of the similarity between the data X and the data Y does not include a logarithm term.

5. The computing device of claim 1, wherein the determination of the similarity between the data X and the data Y comprises:
   upon determining that the estimated MI is at or above the predetermined threshold, generating a positive scalar output; and
   upon determining that the estimated MI is not at or above the predetermined threshold, generating a negative scalar output.

6. The computing device of claim 1, wherein the permuted version of the data Y comprises a random distribution of the N samples of the data Y with respect to the N samples of the data X.

7. The computing device of claim 1, wherein the loss mean is f(x_i, y_i)–exp(–eta) [mean exp [f(x_i, y0_i)]]+$\eta$–1.

8. The computing device of claim 1, wherein the estimation of the MI is based on I(xt, yt)>=mean f(xt_i, yt_i)–log [mean exp [f(xt_i, yt_i)]].

9. The computing device of claim 1, wherein $\eta$ plays a role of a Lagrange multiplier that ensures normalization of a likelihood ratio.

10. The computing device of claim 1, wherein the estimation of the mutual information (MI) between the test data $X_T$ and $Y_T$ includes a linear witness function.

11. The computing device of claim 1, wherein the execution of the engine by the processor further configures the computing device to perform an act comprising: using the estimated mutual information (MI) in the context of a generative adversarial network (GAN).

12. A non-transitory computer readable storage medium tangibly embodying a computer readable program code having computer readable instructions that, when executed, causes a computer device to carry out a method of determining a mutual information (MI) between data, the method comprising:
   receiving a data X having N samples and a data Y having N samples;
   defining a function f(x,y) to be a trainable neural network based on the data X and the data Y;
   defining $\eta$ to be a trainable scalar variable;
   creating a permuted version of the data Y;
   computing a loss mean based on the trainable neural network f(x,y), a permuted version of a sample of the N samples of data Y, and the trainable scalar variable $\eta$;
   minimizing a loss with respect to the trainable neural network f(x,y) and the trainable scalar variable $\eta$;
   determining whether the trainable neural network f(x,y) having undergone the minimization of the loss provides an output that meets one or more predetermined criteria;
   upon determining that the trainable neural network f(x,y) has not met the one or more predetermined criteria, returning to the act of creating a permuted version of a second sample of the N samples of data Y;
   upon determining that the trainable neural network f(x,y) has met the one or more predetermined criteria:
   receiving test data $X_T$ and $Y_T$;
   estimating a mutual information (MI) between the test data $X_T$ and $Y_T$;
   upon determining that the estimated MI is at or above a predetermined threshold, deeming the test data $X_T$ and $Y_T$ to be dependent; and
   upon determining that the estimated MI is not at or above the predetermined threshold, deeming the test data $X_T$ and $Y_T$ to be independent.

13. The non-transitory computer readable storage medium of claim 12, wherein the one or more predetermined criteria comprise at least one of:
   a loss with respect to the trainable neural network f(x,y) and the trainable scalar variable $\eta$ is at or below a predetermined threshold; or
   a maximum number of iterations of minimizing the loss with respect to the trainable neural network f(x,y) and the trainable scalar variable $\eta$ is reached.

14. The non-transitory computer readable storage medium of claim 12, further comprising determining a similarity between the data X and the data Y by way of KL divergence for various bounds.

15. The non-transitory computer readable storage medium of claim 14, wherein the determination of the similarity between the data X and the data Y does not include a logarithm term.

16. The non-transitory computer readable storage medium of claim 12, wherein the determination of the similarity between the data X and the data Y comprises:
   upon determining that the estimated MI is at or above the predetermined threshold, generating a positive scalar output; and
   upon determining that the estimated MI is not at or above the predetermined threshold, generating a negative scalar output.

17. The non-transitory computer readable storage medium of claim 12, wherein the permuted version of the data Y comprises a random distribution of the N samples of the data Y with respect to the N samples of the data X.

18. The non-transitory computer readable storage medium of claim 12, wherein the loss mean is f(x_i, y_i)−exp(−eta) [mean exp [f(x_i, y0_i)]]+η−1.

19. The non-transitory computer readable storage medium of claim 12, wherein the estimation of the MI is based on I(xt, yt)>=mean f(xt_i, yt_i)−log [mean exp [f(xt_i, yt_i)]].

20. The non-transitory computer readable storage medium of claim 12, wherein the estimation of the mutual information (MI) between the test data $X_T$ and $Y_T$ includes a linear witness function.

* * * * *